May 5, 1959  V. C. MOORE  2,884,809
TWIN TURBINE TRANSMISSION WITH PLURAL RATIO DRIVE GEARING
Filed Nov. 21, 1955
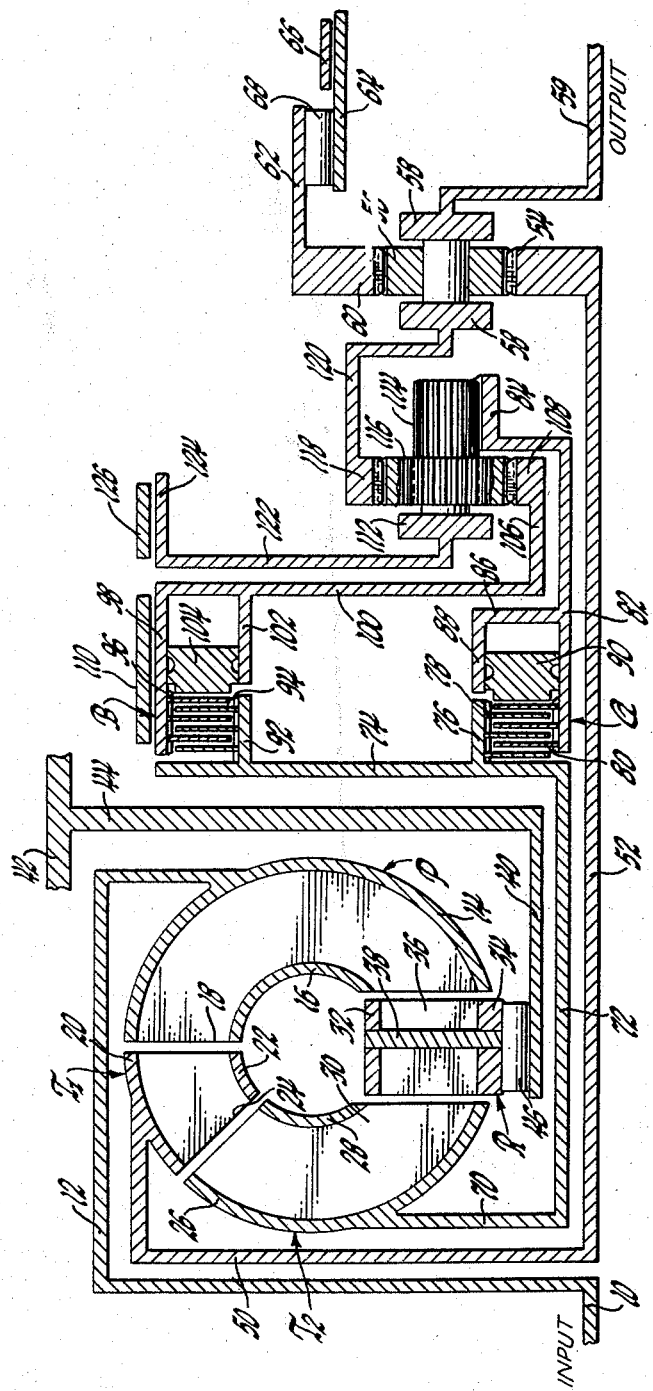
INVENTOR
Victor C. Moore
BY
W. C. Middleton
ATTORNEY

United States Patent Office

2,884,809
Patented May 5, 1959

2,884,809

TWIN TURBINE TRANSMISSION WITH PLURAL RATIO DRIVE GEARING

Victor C. Moore, Plymouth, Mich., assignor to General Motors Corporation, Detroit, Mich., a corporation of Delaware Application November 21, 1955, Serial No. 548,052

19 Claims. (Cl. 74—677)

This invention relates to transmissions incorporating multiple turbine torque converters and gearing and more particularly, to such transmissions including twin turbine torque converters and planetary gearing connecting the two turbines for the transmission of torque from the input of the transmission to the output thereof.

Transmissions involving multiple turbine torque converters and gearing have been constructed in such fashion that the first turbine of the converter is connected to drive an input element of a planetary gear unit; the second turbine is connected to drive either a second input element of the gear unit or the output element thereof and the gear unit, in addition to input and output elements, is provided with a reaction element. In such arrangements initial drive is provided by the first turbine with the second turbine subsequently assuming first part of the torque load and later the entire torque load, at which time the first turbine ceases to transmit torque and idles in the fluid circuit of the torque converter. The present invention provides an arrangement whereby drive may be initially by the first turbine, with a subsequent assumption of the entire torque load by the second turbine, with the additional feature that the drive by the second turbine may be at a reduction ratio or at direct drive ratio. The invention further contemplates an arrangement whereby drive by the first turbine may be eliminated and drive by the second turbine may be at different ratios including a low speed ratio, an intermediate speed ratio corresponding to the reduction drive by the second turbine in its assumption of the entire torque load from the first turbine as before described, and direct drive by the second turbine. Inasmuch as the first turbine is prevented from transmitting torque, it follows that the transmission of torque by the second turbine is without benefit of the variation in speed ratio which takes place in operation wherein the first turbine affords the initial drive.

An object of the present invention is to provide a transmission incorporating a multiple turbine torque converter and gearing connecting the turbines to the transmission output in such fashion that initial drive may be either by the first turbine or by the second turbine.

Another object of the invention is to provide a transmission as just described wherein initial drive is provided by the first turbine and subsequent assumption of the entire transmission of torque by the second turbine can be communicated to the output either at direct ratio or at reduction ratio.

Another object of the invention is to provide an arrangement of the foregoing character in which provision is made for establishing reaction in the gear set driven by the first turbine and for releasing such reaction establishment whereby the reaction element of the gear set is free to rotate in either direction.

A further object of the invention is to provide an arrangement as before described in which two planetary gear units are incorporated, one to be driven by the first turbine and the other to be driven by the second turbine, with the gear unit driven by the second turbine capable of being conditioned for reduction drive and direct drive when the drive by the second turbine is correlated with that of the first turbine.

A still further object of the invention is to provide a gear unit driven by the second turbine with the gear unit being of such character and having such controls therefor as to be capable of transmitting torque to the transmission output at low, intermediate and direct speed ratios and also for transmitting torque to the output unit in reverse direction.

In carrying out the foregoing and other objects of the invention use is made of a torque converter which has a pump driven by the input of the transmission, first and second turbines receiving fluid from the pump successively in the order named, and a reaction member for returning fluid from the second turbine to the pump. The reaction member may be of a type which is releasably held against reverse rotation and, if desired, the blades of this reaction member may be capable of rotation from a low torque multiplication angular position to a high torque multiplication angular position. The first turbine of the converter is connected to drive the input element of a first planetary gear unit which gear unit has a reaction element which can be held against reverse rotation by a releasable one-way mechanism and which can be released for rotation in either direction by the release of the one-way mechanism. The first gear unit has its output element connected to the transmission output. The second turbine is connected to drive either one or two input elements of a compound planetary gear unit which, in addition to input elements, is provided with a planet carrier having pinions meshing respectively with the input elements and with the pinions in turn meshing with each other. One pinion also is in mesh with the output element of this compound planetary unit which is connected to the output element of the first gear unit. The output element of this first gear unit therefore can receive drive either from the first turbine, from both turbines or from the second turbine alone. Provision is made for selectively causing drive of one of the input elements of the compound planetary unit by the second turbine, drive of both input elements thereof, or of locking one of said input elements against rotation whereby it, under certain conditions, operates as a reaction element. In addition, the planet carrier of the compound planetary unit can be locked against rotation to provide reaction therefor both for low speed reduction ratio and for reverse drive. The various conditions of the elements associated with the planetary gear units can be established by friction engaging elements such as brake bands and clutches which can be applied selectively by hydraulic pressure or the like in well known fashion.

Other features, objects and advantages of the invention will become apparent by reference to the following detailed description of the accompanying drawing illustrating a diagrammatic representation of the invention.

Referring to the drawing, 10 indicates the input of the transmission which can be driven by an internal combustion engine or any other source of motive power. Input 10 drives the pump P of a torque converter by a drive connection 12. The pump P of this torque converter has an outer shroud 14, an inner shroud 16 and blades 18 therebetween. The torque converter has two turbines, T1 and T2, positioned to receive the fluid discharged from the pump P successively in the order named. Turbine T1 has an outer shroud 20, an inner shroud 22 and blades 24 therebetween. Turbine T2 has an outer shroud 26, an inner shroud 28 and blades 30 therebetween. The final member of the converter comprises a reaction member indicated generally at R composed of an outer shroud 32, an inner shroud 34 and blades 36 mounted therebetween for pivotal motion about pivots 38. Rotation of the blades 36 about their axes may be accomplished in any of several well known manners such as, for example, those illustrated and described in the copending applications of Oliver K. Kelley, S.N. 328,090, filed December 26, 1952, now abandoned, for Transmission and Controls; Edsall et al., S.N. 353,782, filed May 8, 1953, for Automatic Transmission, and Kelley, S.N. 403,813, filed January 13, 1955, for Hydrodynamic Torque Converters. As described in these applications, the blades of a reaction member may be rotated within a range extending from a high torque multiplication angular position to a low torque multiplication angular position. Variation in angularity of the blades of the reaction member for varying the torque multiplication characteristics of the torque converter form no part of the present invention and hence illustration thereof and description of such variation is not included. The reaction member R can be held against reverse rotation by one-way mechanism comprising a sleeve shaft 40 secured to a part of the transmission casing 42 by a radial extension 44 so that the sleeve shaft 40 is held against rotation in either direction. Between the shaft 40 and the inner shroud 34 of the reaction member are positioned one-way elements 46 such as rollers or sprags of well known construction.

The first turbine T1 has a drive connection 50 to a shaft 52 to the remote end of which is connected sun gear 54 of the first planetary gear unit. Sun gear 54 meshes with planet pinions 56 supported by the planet carrier 58, and pinions 56 in turn mesh with ring gear 60. Ring gear 60 has an axially extending tubular member 62 forming one race of a one-way mechanism, the other race of which comprises a shaft 64 which can be locked against rotation in either direction by a brake band 66. One-way elements 68 are positioned between the races afforded by the two shafts 62 and 64 and these elements again may be rollers or sprags of well known construction. The brake band 66 can be hydraulically or mechanically applied in well known fashion to lock shaft 64 against rotation so that when this shaft is so locked the shaft 62 and the ring gear 60 are precluded against rotation in the reverse direction, i.e., in a direction reverse to the direction of rotation of sun gear 54. Planet carrier 58 is connected to drive the transmission output 59.

Second turbine T2 has a drive connection 70 to a shaft 72, the remote end of which is provided with a radial disk-like formation 74. Extended from disk 74 is a flange 76 internally splined for the externally splined clutch plates 78. These plates are part of a clutch identified in general as clutch A. The other plates 80 of this clutch are internally splined to be received by splines on a sleeve shaft 82 to the end of which is secured a sun gear 84. The shaft 82 has a radial extension 86 provided with a flange 88 cooperating with the shaft 82 to form a cylinder in which is slidably mounted a piston 90. This piston can be moved under hydraulic or other suitable pressure to cause engagement of the plates 78 and 80 of the clutch A thereby to cause rotation of the shaft 82 with the shaft 72 and consequently rotation of the sun gear 84.

The disk 74 is also provided with an externally splined flange 92 receiving plates 94 of a clutch identified in general as clutch B. The other plates of this clutch are indicated at 96 and are externally splined to be received by the internal splines of a flange 98 extending axially from a disk 100. Disk 100 has a second flange 102 cooperating with flange 98 to form a cylinder in which is slidably mounted piston 104 moved under hydraulic or other pressure to engage the plates 94 and 96 of clutch B thereby to compel rotation of the disk 100 with the disk 74. Disk 100 has an axially extending extension 106 to which is secured a sun gear 108. A brake band 110 hydraulically or otherwise applied can lock the extension 98 and the sun gear 108 against rotation in either direction.

Sun gears 84 and 108 form parts of a compound planetary gear unit which unit also includes a planet carrier 112 which rotatably supports long pinions 114 and short pinions 116. The long pinions 114 are in mesh with the sun gear 84 and also with the short pinions 116. The short pinions 116 are in mesh with the sun gear 108 and with a ring gear 118 having drive connection 120 to the carrier 58 of the first gear unit and by this carrier to the output 59. Planet carrier 112 has a connection 122 to a drum 124 which can be locked against rotation in either direction by a brake band 126. This band can be applied by hydraulic or other suitable pressure.

The transmission just described is capable of several modes of operation. If desired, the transmission can be conditioned in such fashion that the transmission of torque from the input to the output can be by way of both of the turbines T1 and T2, or can be solely by way of the second turbine T2.

*Transmission of torque with both turbines operative*

It is desired to take advantage of the variable ratio transmission of torque which can be obtained by use of both turbines of the converter with the first turbine T1 initially transmitting torque the transmission can be conditioned in either of two different fashions. In either thereof the brake 66 is applied to the sleeve shaft 64 to lock it against rotation in either direction thereby to activate the one-way mechanism including the one-way elements 68. If it is desired that drive by the second turbine be at a reduction ratio the brake 110 is applied to the drum 98 locking the sun gear 108 against rotation in either direction. Clutch B is released when the brake 110 is applied. Clutch A is applied by the application of hydraulic or other pressure to the piston 90. With the transmission so conditioned and with the pump P of the converter being driven by the input 10, the initial transmission of torque will be by the turbine T1 which will cause rotation of sun gear 54 of the first planetary unit. Inasmuch as the output 59 is connected to the load to be activated, rotation of sun gear 54 tends to cause reverse rotation of ring gear 60 which reverse rotation is prevented by the one-way mechanism including element 68. Consequently, with ring gear 60 affording reaction the carrier 58 is compelled to rotate in the same direction as sun gear 54 but at a reduced speed ratio depending on the ratio of the first gear unit. Rotation of carrier 59 causes simultaneous rotation of the output 59.

The blades of the torque converter are so shaped as to cause the fluid discharged by the pump P to impart forward rotation to the turbine T1 and to cause the impingement of the fluid discharged by the turbine T1 upon the blades of the turbine T2 in such direction as would normally cause this turbine to rotate backwardly relative to the first turbine. Backward rotation of turbine T2 is prevented by the gear connection between turbine T2 and the carrier 58 of the first planetary unit. When carrier 58 is compelled to rotate in a forward direction by rotation of sun gear 54, this forward rotation is communicated to ring gear 118 of the compound unit which meshes with the short pinions 116. Sun gear 108 of the compound planetary unit is held against rotation in either direction and in this situation serves as a reaction member so that short pinions 116 must walk around the sun gear 108 and in so doing, the carrier 112 is moved in the same direction as the ring gear 118. Long pinions 114, however, are compelled to rotate in the reverse direction and this reverse rotation in turn causes the sun gear 84 to rotate in the forward direction which forward rotation is imparted to the turbine T2. Consequently, even though turbine T2 is initially subjected to negative torque, it is compelled to rotate in the forward direction.

While the first turbine is transmitting the entire or major part of the torque being transmitted by the converter, the carrier 58 and output 59 will be rotated at the reduced speed ratio. As the first turbine T1 is accelerated and the speed of rotation thereof approaches that of the pump P, the direction of fluid flow in the converter changes until the liquid circulated thereby instead of exerting a negative torque on the second turbine T2, exerts forward torque thereon which causes this turbine to be rotated in the forward direction. The forward rotation of turbine T2 is communicated through the compound gear unit to the carrier 58 but at a reduction gear ratio. This torque path is the reverse of that previously described in connection with the compound gear unit but it seems well to trace the same at this point. Rotation of turbine T2 is imparted to the sun gear 84 (clutch A being engaged) rotating sun gear 84 in the same direction as the turbine. Sun gear 84 therefore rotates the long pinions 114 in the opposite direction and these pinions being in mesh with short pinions 116 cause them to rotate in the forward direction. With sun gear 108 held against rotation, the short pinions 116 must walk around sun gear 108 imparting forward rotation to carrier 112 and also causing ring gear 118 to rotate in the forward direction but at a reduced ratio relative to the speed of rotation of turbine T2. Carrier 58, connected to ring gear 118, is therefore compelled to rotate in the forward direction at a speed which is determined by the rotation of sun gear 54 and also ring gear 118. The end result is rotation of the output 59 at a different ratio from that caused solely by sun gear 54.

Continued acceleration of the second turbine T2 will cause it eventually to assume the transfer of the entire torque transmitted by the turbine at which time torque is no longer transmitted by turbine T1 so that sun gear 54 connected thereto is ineffective to transmit torque to the pinions 56. At this time the first turbine T1 is floating in the fluid circuit and the ring gear 60 is free to rotate in the forward direction without affording reaction for the first planetary unit. Sun gear 54 and ring gear 60 therefore are capable of such forward rotation as may be compelled by the rotation of carrier 58 at a reduced speed ratio relative to turbine T2 which is supplying the entire torque transmission. The output 59 therefore will continue to rotate at reduced speed solely under the impetus supplied by the turbine T2 so long as the friction engaging devices remain in the prescribed condition.

If it is desired to cause the second turbine T2 to transmit torque at a one-to-one ratio, it is necessary only to release the brake band 110 and to engage the clutch B with the clutch A remaining engaged. At this time rotation of turbine T2 causes simultaneous rotation of the two sun gears 84 and 108 which simultaneous rotation in effect locks up the compound planetary unit compelling all of the elements thereof to rotate in unison. This rotation is imparted to the carrier 58 and thence to output 59.

It will be understood that the transmission can be operated from rest with the second planetary unit conditioned as just described with the result that the initial transmission of torque will be by the first turbine T1 with a subsequent assumption of the entire torque load by the second turbine. When this latter condition is attained, the output 59 will be rotated at the same rate as the second turbine T2 and again sun gear 54 and ring gear 60 are free to rotate in the same direction in a freewheeling manner.

It will be further understood that a transition from reduction drive to direct drive or from direct drive to reduction drive by the second turbine can be made at any time in the operation of the transmission since such transition requires only the alternate engagement and release of the brake band 110 and clutch B.

*Drive by second turbine only*

Under some conditions it may be desirable to multiply the torque transmitted by the converter to a greater extent than that afforded by the second planetary unit conditioned for reduction drive. To accomplish this added torque multiplication, the transmission is conditioned by releasing the brake 66, applying the brake 126, releasing brake 110, releasing clutch B and applying clutch A. If this condition is established prior to the transmission of torque to the output, the following will occur. Rotation of pump P discharges fluid into the turbine T1 but this turbine has been rendered ineffective to transmit torque due to the release of the brake band 66. Consequently, rotation of turbine T1 causes rotation of sun gear 54 but ring gear 60 no longer supplies reaction and with load on the output, the ring gear 60 rotates in the backward direction and no torque is transmitted through the first gear unit. Consequently, the first turbine T1 quickly accelerates at least to the same speed as the pump P and possibly, due to blade form, to a greater speed. In any event, fluid passes through the blades of turbine T1 and impinges on the blades of the turbine T2 in a direction to cause forward rotation of turbine T2. This forward rotation of turbine T2 is communicated through the clutch A to the sun gear 84. Carrier 112 is held against rotation in either direction by the brake 126 so that rotation of sun gear 84 in a forward direction causes rotation in the reverse direction of the long pinions 114. These long pinions in turn cause forward rotation of the short pinions 116 which compel ring gear 118 to rotate in the forward direction and this forward rotation is transmitted to the output by way of the carrier 58. Since both clutch B and brake 110 are released, the sun gear 108 is free to rotate as it may be compelled. The forward rotation of ring gear 118 in the manner just described is at a lower speed ratio than that which can be obtained by the application of band 110.

It will be observed in the last example that the entire torque transmitted by the converter is transmitted solely by the turbine T2 and this torque is multiplied through the compound planetary unit causing rotation of the output at a relatively low speed ratio. This ratio can be maintained as long as desired but it is contemplated that the transmission of torque solely by the second turbine can be accomplished at a higher speed ratio at any desired time by the proper engagement of one of the friction engaging devices and the release of another thereof. For example, a higher speed ratio, with the first turbine incapable of transmitting torque, can be obtained by releasing the brake 126 and applying the brake 110 with the clutch B released. When this condition is established the transmission of torque by the second turbine T2 is by way of sun gear 84 with sun gear 108 affording reaction in the manner previously described. Furthermore, it is possible to transmit torque at a one-to-one ratio between the turbine T2 and the output 59 with the turbine T1 ineffective to transmit torque by releasing the brake 110 and engaging the clutch B. Under this condition the two sun gears 84 and 108 are compelled to rotate at the same speed; the compound planetary unit is locked up and one-to-one drive from the second turbine T2 to the output shaft takes place as previously described. It will be noted that in all three speed ratios just described, the clutch A remains engaged.

It is within the intent of this invention that changes in the operating conditions of the transmission can be accomplished either manually or automatically for the application of certain friction engaging devices and the releasing of others thereof. However, such controls form no part of the present invention and are not illustrated or described.

*Reverse*

Reverse rotation of the output 59 relative to the input 10 can be accomplished by the application of the proper friction engaging devices and the releasing of others thereof. To this end the brake 126 is applied, the clutch B is applied while brakes 110 and 66 and clutch A are released. Release of brake 66 renders the first turbine T1 ineffective to transmit torque. Turbine T2 therefore must transmit the entire torque load and such transmission is by way of clutch B to the sun gear 108. Carrier 112 is held against rotation in either direction so that rotation of sun gear 108 in a forward direction rotates the short pinions 116 in the opposite direction and with the carrier held against rotation, this reverse rotation of the short pinions 116 is translated into reverse rotation of the ring gear 118 and thence carrier 58 and output 59. Rotation of the short pinions 116 causes rotation of the long pinions 114 and by them rotation of sun gear 84 in a free fashion since clutch A is released. The entire torque transmitted by the converter therefore is communicated to the output 59 in reverse direction of rotation by the second turbine T2 and the compound planetary unit in the manner just described.

During the transmission of torque by either or both of the turbines T1 and T2 the torque converter functions in the manner normal to converters of this type. During the early stages of operation the converter serves to multiply torque at a ratio depending on the angularity of the blades 36 of the reaction member R. As operation progresses the fluid circuit eventually will impinge upon the blades 36 of the reaction member at such an angle as to cause this reaction member to rotate in the same direction as the pump P. When this occurs the converter no longer multiplies torque but acts as a fluid coupling. The foregoing action takes place during transmission of torque with the two turbines cooperating and also with the transmission of torque solely by the second turbine. As before-mentioned, the angularity of the reaction member blades can be varied at any time within the specified range.

It is to be understood that the invention is capable of modification beyond the illustrated embodiment and hence any limitations imposed thereupon are to be only those set forth in the following claims.

I claim:

1. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit having means for transmitting torque at a plurality of forward reduction drive ratios and direct drive ratio from the second of said turbines to said transmission output, and control means for conditioning said second gear unit to transmit torque at said plurality of forward reduction drive ratios and direct drive ratio.

2. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit having means for transmitting torque at a plurality of forward reduction drive ratios and direct drive ratio from the second of said turbines to said transmission output, and control means for conditioning said second gear unit to transmit torque at said plurality of forward reduction drive ratios and direct drive ratio.

3. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit having means for transmitting torque at a plurality of forward reduction drive ratios and direct drive ratio from the second of said turbines to said transmission output, control means for conditioning said second gear unit to transmit torque at said plurality of forward reduction drive ratios and direct drive ratio, and means for releasing said one-way mechanism to cause said first turbine to be ineffective to transmit torque.

4. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit having means for transmitting torque at a plurality of forward reduction drive ratios and direct drive ratio from the second of said turbines to said transmission output, and control means for conditioning said second gear unit to transmit torque selectively at said plurality of forward reduction and direct drive ratios and at reverse reduction drive ratio.

5. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit having means for transmitting torque at a plurality of forward reduction drive ratios and direct drive ratio from the second of said turbines to said transmission output, and control friction engaging means for conditioning said second gear unit to transmit torque at said plurality of forward reduction drive ratios and direct drive ratio and at reverse reduction drive ratio.

6. A transmission of the type described having input and output and comprising a torque converter having a pump, multiple turbines, and a reaction member, said pump circulating fluid successively through said turbines and said reaction member, a first gear unit having input, output, and reaction elements, a driving connection for transmitting torque between the first of said turbines and said input element, a driving connection between said output element and said transmission output, releasable one-way mechanism for preventing reverse rotation of said reaction member, a second gear unit having means for transmitting torque at a plurality of forward reduction drive ratios and direct drive ratio from the second of said turbines to said transmission output, and control means for conditioning said second gear unit to transmit torque at said plurality of forward reduction drive ratios and direct drive ratio, release of said one-way mechanism causing said first turbine to be ineffective to transmit torque to said transmission output whereby said second turbine only transmits torque to said transmission output through said second gear set.

7. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, releasable one-way mechanism for preventing reverse rotation of said reaction member, a second gear unit having means for transmitting torque at a plurality of forward reduction drive ratios and direct drive ratio from the second of said turbines to said transmission output, and control means for alternatively conditioning said second gear unit to transmit torque at one reduction and direct drive speed ratios, and control means for selectively conditioning said second gear unit to transmit torque at a different forward reduction speed ratio when said one-way mechanism is released.

8. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, releasable one-way mechanism for preventing reverse rotation of said reaction member, a second gear unit having means for transmitting torque at a plurality of forward reduction drive ratios and direct drive ratio from the second of said turbines to said transmission output, control means for conditioning said second gear unit to transmit torque at said plurality of forward reduction and direct drive speed ratios, and control means for selectively conditioning said second gear unit to transmit torque to said transmission output in reverse direction when said one-way mechanism is released.

9. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, releasable one-way mechanism for preventing reverse rotation of said reaction member, a second gear unit having means for transmitting torque at a plurality of forward reduction drive ratios and direct drive ratio from the second of said turbines to said transmission output, control means for alternatively conditioning said second gear unit to transmit torque at one reduction and direct drive speed ratios, control means for selectively conditioning said second gear unit to transmit torque at a different forward reduction speed ratio when said one-way mechanism is released, and control means for selectively conditioning said second gear unit to transmit torque to said transmission output in reverse direction when said one-way mechanism is released.

10. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, and means for connecting both of said input gears to said second turbine to drive said output gear at direct drive ratio.

11. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, means for connecting both of said input gears to said second turbine to drive said output gear at direct drive ratio, and means for releasing said one-way mechanism to cause transmission of torque to said transmission output by said second turbine only through said second gear unit.

12. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, and means for selectively connecting both of said input gears to said second turbine to drive said output gear at direct drive ratio, and for connecting one of said input gears to said second turbine while preventing rotation of the other input gear thereby to drive said output gear at reduction drive ratio.

13. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, means for selectively connecting both of said input gears to said second turbine to drive said output gear at direct drive ratio, and for connecting one of said input gears to said second turbine while preventing rotation of the other input gear thereby to drive said output gear at reduction drive ratio, and means for releasing said one-way mechanism to cause transmission of torque to said transmission output by said second turbine only through said second gear unit.

14. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, and means for selectively connecting one of said input gears to said second turbine and for preventing rotation of the other input gear to drive said output gear at reduction ratio.

15. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, means for selectively connecting one of said input gears to said second turbine and for preventing rotation of the other input gear to drive said output gear at reduction ratio, and means for releasing said one-way mechanism to cause transmission of torque to said transmission output by said second turbine only through said second gear unit.

16. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, and means for selectively connecting one of said input gears to said second turbine and for holding said carrier against rotation to drive said output gear at reduction ratio.

17. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, one-way mechanism for preventing reverse rotation of said reaction element, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, means for selectively connecting one of said input gears to said second turbine and for holding said carrier against rotation to drive said output gear at reduction ratio and means for releasing said one-way mechanism to cause transmission of torque to said transmission output by said second turbine only through said second gear unit.

18. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a second gear unit for transmitting torque from the second of said turbines to said transmission output, said second gear unit comprising input gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output and means for selectively connecting one of said input gears to said second turbine and for holding said carrier against rotation to drive said output gear at reduction ratio in reverse direction.

19. A transmission of the type described having input and output and comprising a torque converter having a pump, multiple turbines, and a reaction member, said pump circulating fluid successively through said turbines and said reaction member, a first gear unit having input, output, and reaction elements, a driving connection between the first of said turbines and said input element, a driving connection between said output element and said transmission output, a releasable one-way mechanism for holding said reaction element against reverse rotation, a second gear unit for transmitting torque from the second of said turbines to said transmission output, said second gear unit comprising sun gears, a planet carrier supporting sets of pinions, the pinions of one set meshing with the pinions of the other set, one input gear meshing with the pinions of one of the sets, the other input gear meshing with the pinions of the other set, and an output gear meshing with the pinions of one of said sets and connected to said transmission output, and means for selectively releasing said one-way mechanism, connecting one of said input gears to said second turbine and holding said carrier against rotation to drive said output gear in reverse.

References Cited in the file of this patent

UNITED STATES PATENTS 2,807,967     Seybold _____ Oct. 1, 1957

FOREIGN PATENTS 666,092     Great Britain _____ Feb. 6, 1952